(12) United States Patent
Nishiyama (10) Patent No.: US 9,673,475 B2
(45) Date of Patent: Jun. 6, 2017

(54) FUEL CELL STACK

(71) Applicant: HONDA MOTOR CO., LTD., Tokyo (JP)

(72) Inventor: Tadashi Nishiyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 392 days.

(21) Appl. No.: 14/338,299

(22) Filed: Jul. 22, 2014

(65) Prior Publication Data
US 2015/0037707 A1    Feb. 5, 2015

(30) Foreign Application Priority Data

Aug. 1, 2013  (JP) .................. 2013-160406

(51) Int. Cl.
*H01M 8/00* (2016.01)
*H01M 8/2465* (2016.01)
*H01M 8/1018* (2016.01)

(52) U.S. Cl.
CPC .. H01M 8/2465 (2013.01); *H01M 2008/1095* (2013.01)

(58) Field of Classification Search
CPC .................................................. H01M 8/002
See application file for complete search history.

(56) References Cited

U.S. PATENT DOCUMENTS

| | | | |
|---|---|---|---|
| 6,770,396 B2 | 8/2004 | Hatoh et al. | |
| 2009/0023034 A1* | 1/2009 | Kusakabe | H01M 8/248 429/413 |

FOREIGN PATENT DOCUMENTS

| | | |
|---|---|---|
| JP | S59-186270 | 10/1984 |
| JP | 2001-236982 | 8/2001 |
| JP | 2007-026695 | 2/2007 |
| JP | 2007-035558 | 2/2007 |
| JP | 5136051 B2 | 7/2009 |
| JP | 2010-40500 | 2/2010 |
| JP | 2011-210604 | 10/2011 |
| WO | WO 2010/106753 | 9/2010 |

OTHER PUBLICATIONS

Japanese Office Action for corresponding JP Application No. 2013-160406, Sep. 13, 2016.

* cited by examiner

*Primary Examiner* — Jacob Marks
(74) *Attorney, Agent, or Firm* — Mori & Ward, LLP

(57) ABSTRACT

A fuel cell stack includes a stacked body, a first terminal plate, a second terminal plate, a first resin end plate, and a second resin end plate. The stacked body has a first end and a second end opposite to the first end in a stacking direction. The first terminal plate is provided on the first end of the stacked body in the stacking direction to have a first surface substantially parallel to surfaces of first and second electrodes. The first terminal plate includes a first reinforcement rib provided in the first surface. The second terminal plate is provided on the second end of the stacked body in the stacking direction to have a second surface substantially parallel to the surfaces of the first and second electrodes. The second terminal plate includes a second reinforcement rib provided in the second surface.

11 Claims, 4 Drawing Sheets

FUEL CELL STACK

CROSS-REFERENCE TO RELATED APPLICATIONS

The present application claims priority under 35 U.S.C. §119 to Japanese Patent Application No. 2013-160406, filed Aug. 1, 2013, entitled "Fuel Cell Stack." The contents of this application are incorporated herein by reference in their entirety.

BACKGROUND

1. Field

The present disclosure relates to a fuel cell stack.

2. Description of the Related Art

For example, a solid polymer electrolyte membrane, which is made from a polymer ion-exchange membrane, is used in a solid polymer electrolyte fuel cell. The fuel cell includes a membrane electrode assembly (MEA), in which the solid polymer electrolyte membrane is sandwiched between an anode electrode and a cathode electrode. Each of the anode electrode and the cathode electrode includes an electrode catalyst (electrode catalyst layer) and a porous carbon (gas diffusion layer). The membrane electrode assembly and separators (bipolar plates), sandwiching the membrane electrode assembly therebetween, constitute a power generation cell. A predetermined number of such power generation cells are stacked and used, for example, as a vehicle fuel cell stack.

In order to obtain a required power, a fuel cell typically includes a stacked body including a predetermined number (for example, several tens to several hundreds) of power generation cells. At each end of the stacked body in the stacking direction, a terminal plate, an insulator, and an end plate are arranged outward. A predetermined clamping load is applied to the pair of end plates.

Because weight reduction is required for a fuel cell stack of this type, for example, a structure using a resin end plate instead of a metal end plate has been proposed. For example, Japanese Patent No. 5136051 discloses a fuel cell including a stacked body, which includes a plurality of unit cell modules that are stacked, and a pair of collector plates (terminal plates) and a pair of resin end plates (end plates), which are disposed at both ends of the stacked body.

SUMMARY

According to one aspect of the present invention, a fuel cell stack includes a stacked body, a terminal plate, and a resin end plate. The stacked body includes a plurality of power generation cells that are stacked. Each of the power generation cells includes a membrane electrode assembly and a separator. The membrane electrode assembly includes an electrolyte and a pair of electrodes sandwiching the electrolyte therebetween. The terminal plate and the resin end plate are disposed at each end of the stacked body in a stacking direction so as to be arranged outward. A reinforcement rib is formed in a surface of each terminal plate. The surface is parallel to surfaces of the electrodes.

According to another aspect of the present invention, a fuel cell stack includes a stacked body, a first terminal plate, a second terminal plate, a first resin end plate, and a second resin end plate. The stacked body includes a plurality of power generation cells stacked in a stacking direction. Each of the plurality of the power generation cells includes a separator and a membrane electrode assembly which includes an electrolyte and first and second electrodes sandwiching the electrolyte between the first and second electrodes. The stacked body has a first end and a second end opposite to the first end in the stacking direction. The first terminal plate is provided on the first end of the stacked body in the stacking direction to have a first surface substantially parallel to surfaces of the first and second electrodes. The first terminal plate includes a first reinforcement rib provided in the first surface. The second terminal plate is provided on the second end of the stacked body in the stacking direction to have a second surface substantially parallel to the surfaces of the first and second electrodes. The second terminal plate includes a second reinforcement rib provided in the second surface. The first resin end plate is provided on the first terminal plate in the stacking direction. The second resin end plate is provided on the second terminal plate in the stacking direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
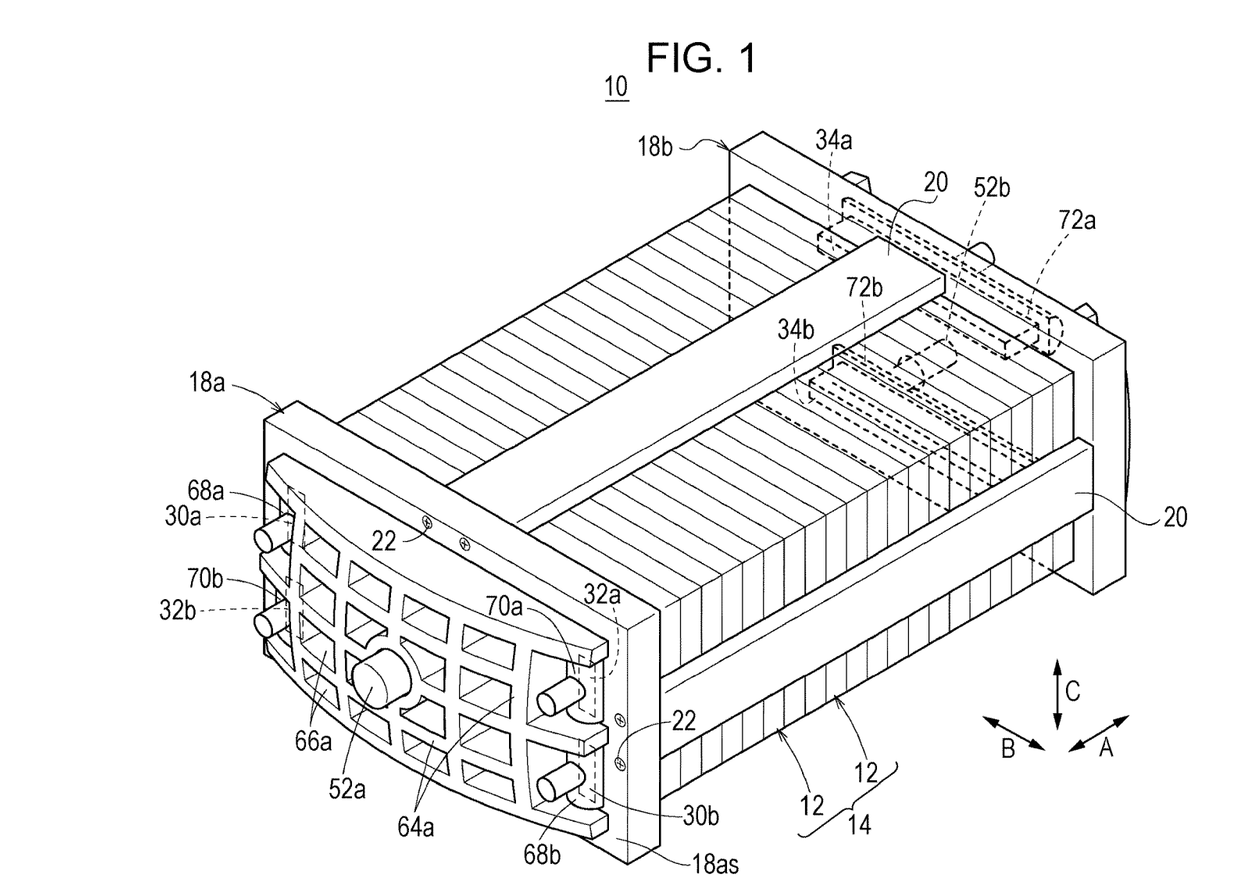
FIG. 1 is a perspective view of a fuel cell stack according to an embodiment.
Figure 2:
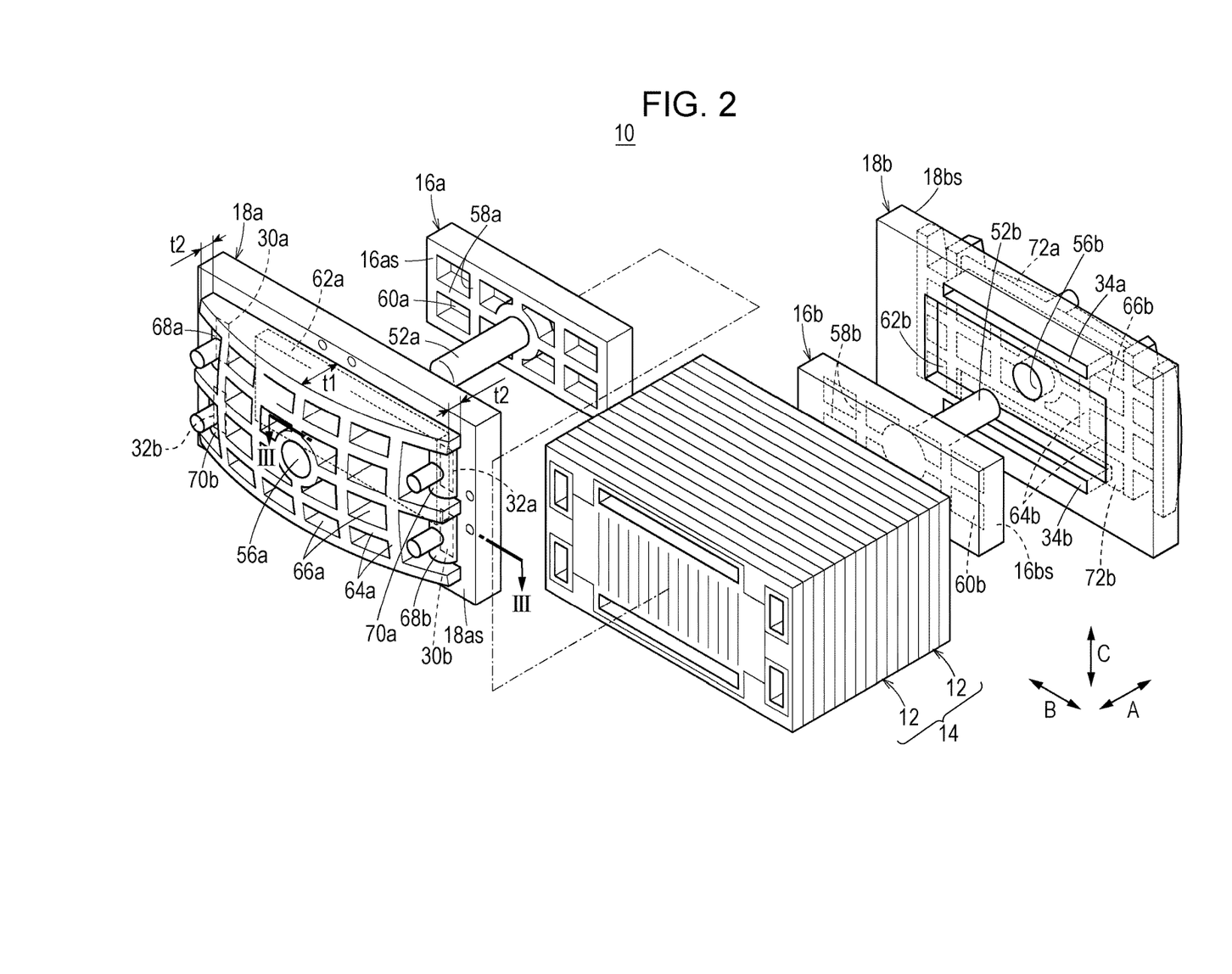
FIG. 2 is a partially exploded schematic perspective view of the fuel cell stack.

Referring to FIGS. 1 and 2, a fuel cell stack 10 according to an embodiment includes a stacked body 14 including a plurality of power generation cell 12 that are stacked in the horizontal direction (direction of arrow A). At one end of the stacked body 14 in the direction of arrow A (stacking direction), a terminal plate 16a and a resin end plate 18a are arranged outward (see FIG. 2). At the other end of the stacked body 14 in the stacking direction, a terminal plate 16b and a resin end plate 18b are arranged outward. The terminal plates 16a and 16b are made of an electrically conducting material, such as copper, aluminum, or stainless steel. The resin end plates 18a and 18b are electrically insulating.

Referring to FIG. 1, the resin end plates 18a and 18b each have a horizontally elongated (or vertically elongated) rectangular shape. Connection bars 20 are disposed between peripheral portions of inner surfaces of the resin end plates 18a and 18b. Ends of each of the connection bars 20 are fixed to the inner surfaces of the resin end plates 18a and 18b with bolts 22 so as to apply a clamping load to the stack of power generation cells 12 in the direction of arrow A (stacking direction).

Alternatively, the connection bars 20 may be attached to side surfaces (extending in the thickness direction) of the resin end plates 18a and 18b and may be fixed to the sides surfaces with bolts. The fuel cell stack 10 may further include a housing that has the resin end plates 18*a* and 18*b* as the end plates thereof, and the stacked body 14 may be disposed in the housing.

Figure 3:
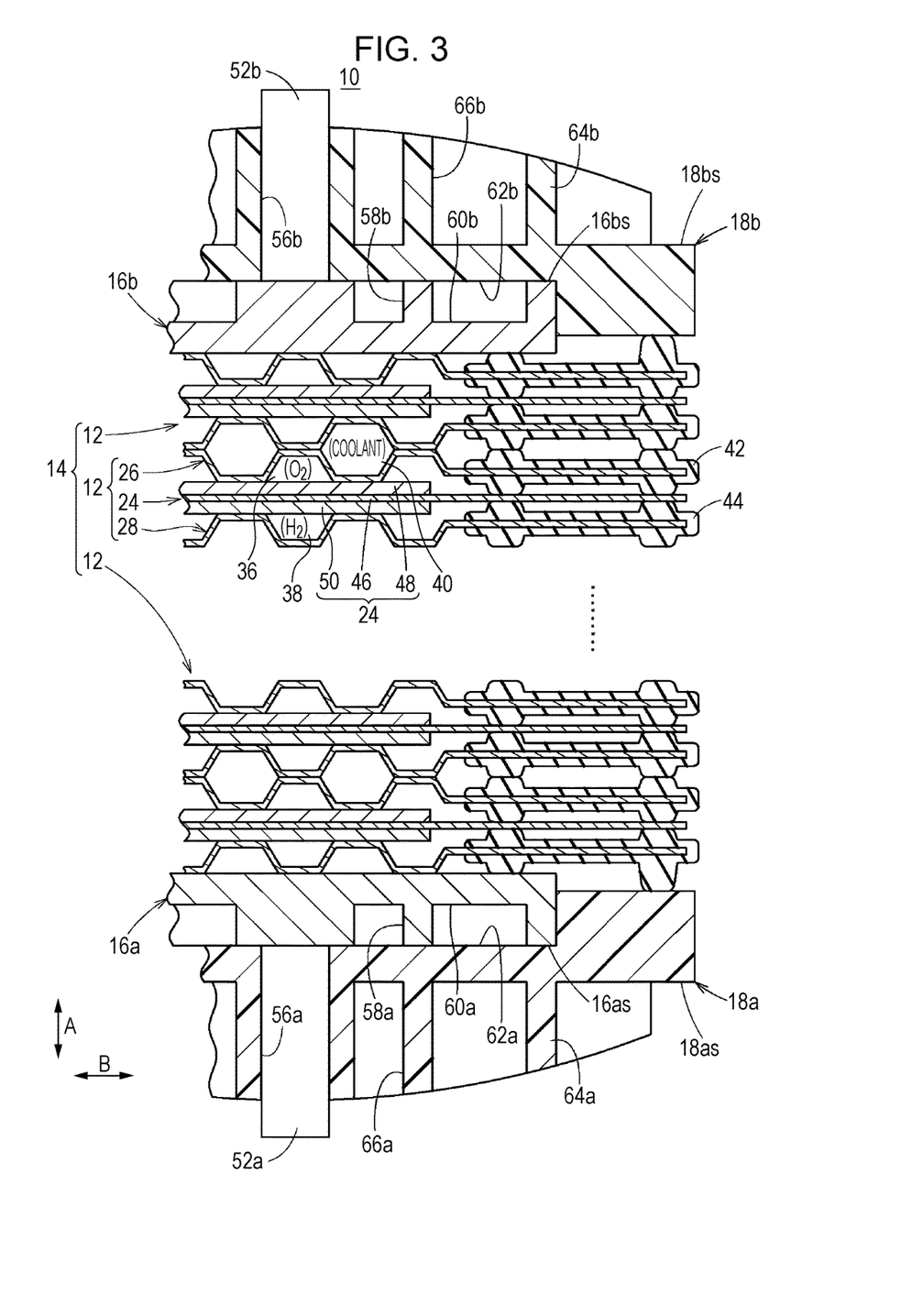
FIG. 3 is a sectional view of the fuel cell stack taken along of FIG. 2.
Figure 4:
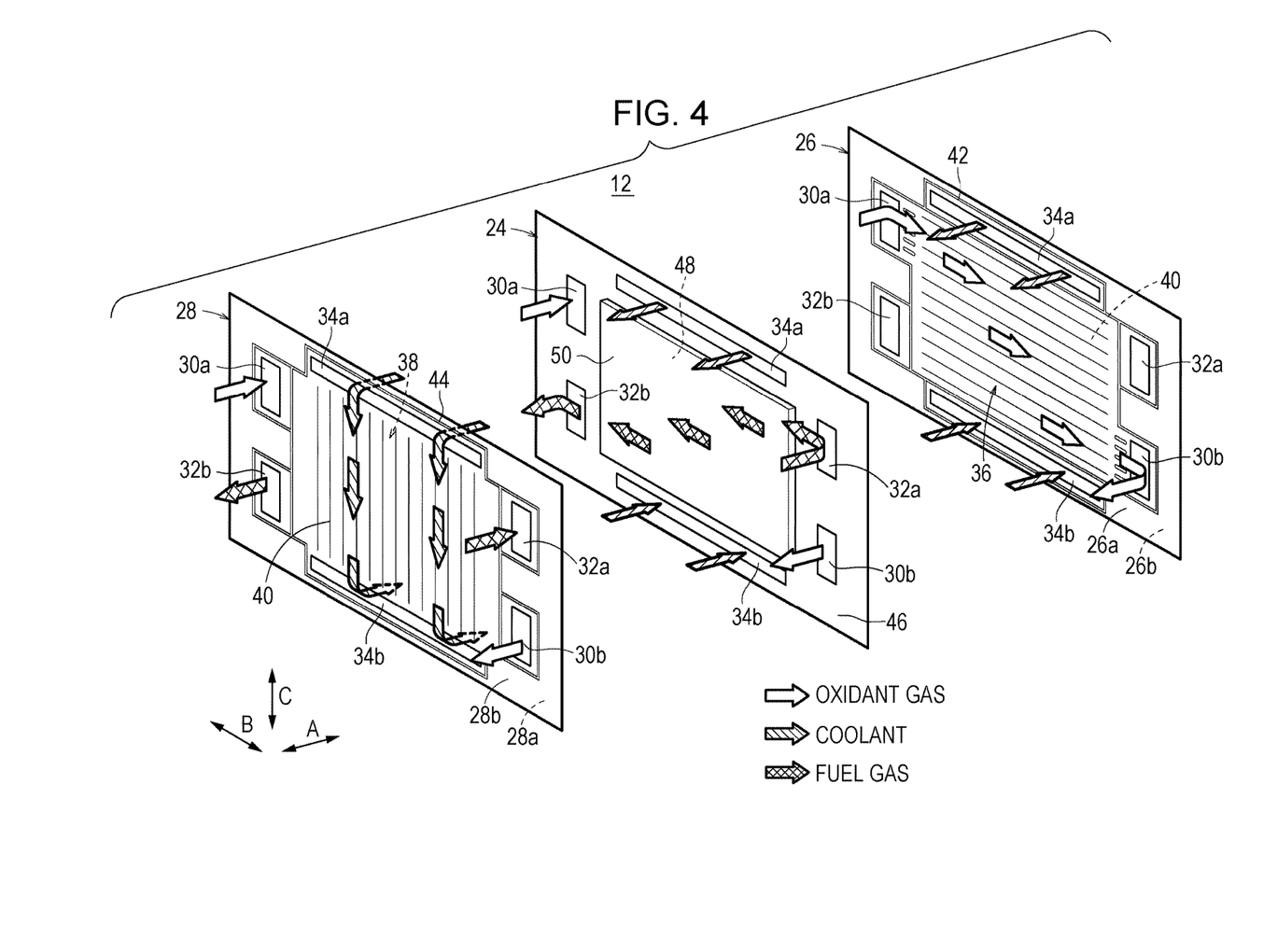
FIG. 4 is an exploded perspective view of a power generation cell of the fuel cell stack.

Referring to FIGS. 3 and 4, the power generation cell 12 includes a membrane electrode assembly 24, and a first separator 26 and a second separator 28 sandwiching the membrane electrode assembly 24 therebetween. Metal separators are used as the first separator 26 and the second separator 28. The first separator 26 and the second separator 28 are each made by press-forming a metal plate into a wave-like shape. Examples of the metal plate include a steel plate, a stainless steel plate, an aluminum plate, a galvanized steel plate, and any of such metal plates having an anti-corrosive coating thereon. Instead of metal separators, carbon separators may be used as the first separator 26 and the second separator 28.

An oxidant gas inlet manifold 30*a* and a fuel gas outlet manifold 32*b* are formed in the power generation cell 12 so as to extend in the direction of arrow A (stacking direction) through one end portion of the power generation cell 12 in the direction of arrow B (horizontal direction in FIG. 4). An oxidant gas, such as an oxygen-containing gas, is supplied through the oxidant gas inlet manifold 30*a*. A fuel gas, such as a hydrogen-containing gas, is discharged through the fuel gas outlet manifold 32*b*. The oxidant gas inlet manifold 30*a* and the fuel gas outlet manifold 32*b* are arranged in the direction of arrow C (vertical direction).

A fuel gas inlet manifold 32*a* and an oxidant gas outlet manifold 30*b* are formed in the power generation cell 12 so as to extend in the direction of arrow A through the other end portion of the power generation cell 12 in the direction of arrow B. The fuel gas is supplied through the fuel gas inlet manifold 32*a*, and the oxidant gas is discharged through the oxidant gas outlet manifold 30*b*. The fuel gas inlet manifold 32*a* and the oxidant gas outlet manifold 30*b* are arranged in the direction of arrow C.

A coolant inlet manifold 34*a*, through which a coolant is supplied, is formed in the power generation cell 12 so as to extend in the direction of arrow A through an upper end portion of the power generation cell 12 in the direction of arrow C. A coolant outlet manifold 34*b*, through which a coolant is discharged, is formed in the power generation cell 12 so as to extend in the direction of arrow A through a lower end portion of the power generation cell 12 in the direction of arrow C.

An oxidant gas channel 36, which is connected to the oxidant gas inlet manifold 30*a* and the oxidant gas outlet manifold 30*b*, is formed on a surface 26*a* of the first separator 26 facing the membrane electrode assembly 24. The oxidant gas channel 36 includes a plurality of channel grooves extending in the horizontal direction (direction of arrow B).

A fuel gas channel 38, which is connected to the fuel gas inlet manifold 32*a* and the fuel gas outlet manifold 32*b*, is formed on a surface 28*a* of the second separator 28 facing the membrane electrode assembly 24. The fuel gas channel 38 includes a plurality of channel grooves extending in the horizontal direction (direction of arrow B).

A coolant channel 40, through which the coolant inlet manifold 34*a* is connected to the coolant outlet manifold 34*b*, is formed between a surface 26*b* of the first separator 26 of the power generation cell 12 and a surface 28*b* of the second separator 28 of an adjacent power generation cell 12. The coolant channel 40 extends in the vertical direction (direction of arrow C).

A sealing member 42 and a sealing member 44 are integrally or independently formed on the first separator 26 and the second separator 28, respectively. Each of the sealing members 42 and 44 is made from an elastic material such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene-rubber, and acrylic rubber.

The membrane electrode assembly 24 includes a solid polymer electrolyte membrane 46, and a cathode electrode 48 and an anode electrode 50 sandwiching the solid polymer electrolyte membrane 46 therebetween. The solid polymer electrolyte membrane 46 is, for example, a thin film made of a perfluorosulfonic acid polymer (or a hydrocarbon polymer) and soaked with water.

The solid polymer electrolyte membrane 46 has a size in a plan view (surface size) that is larger than that of each of the cathode electrode 48 and the anode electrode 50. The membrane electrode assembly 24 may be a stepped MEA, in which the cathode electrode 48 and the anode electrode 50 have different sizes in a plan view (surface sizes).

The cathode electrode 48 and the anode electrode 50 each include a gas diffusion layer and an electrode catalyst layer. The gas diffusion layer is made of carbon paper or the like. The electrode catalyst layer is formed by uniformly coating a surface of the gas diffusion layer with porous carbon particles whose surfaces support a platinum alloy. The electrode catalyst layers are disposed on both sides of the solid polymer electrolyte membrane 46.

Referring to FIGS. 2 and 3, terminal portions 52*a* and 52*b* are disposed at substantially the centers of the terminal plates 16*a* and 16*b* so as to extend outward in the stacking direction. The terminal portions 52*a* and 52*b* may be joined to surfaces 16*as* and 16*bs* of the terminal plates 16*a* and 16*b* by, for example, friction stir welding (FSW) or by screw-fixing. The terminal portions 52*a* and 52*b* extend through holes 56*a* and 56*b*, which are formed in the resin end plates 18*a* and 18*b*, and protrude outward from the resin end plates 18*a* and 18*b*. Alternatively, instead of extending through the resin end plates 18*a* and 18*b*, the terminal portions 52*a* and 52*b* may protrude from side surfaces of the resin end plates 18*a* and 18*b*. The positions of the terminal portions 52*a* and 52*b* are not particularly limited, as long as they are electrically connected to the terminal plates 16*a* and 16*b*.

First reinforcement ribs 58*a* and 58*b* are formed in the surfaces 16*as* and 16*bs* of the terminal plates 16*a* and 16*b*, the surfaces being in contact with the resin end plates 18*a* and 18*b* (the surfaces being parallel to surfaces of the electrodes). The first reinforcement ribs 58*a* and 58*b* are formed, for example, in grid-like patterns between a plurality of substantially rectangular recesses 60*a* and 60*b*, respectively, which are formed in the surfaces 16*as* and 16*bs* so as to be arranged in the horizontal direction and the vertical direction. The shapes and the number of the recesses 60*a* and 60*b* may be changed in various ways. Surfaces of the terminal plates 16*a* and 16*b* facing the power generation cell 12 have flat shapes and are in contact with separators (the first separator 26 and the second separator 28) of the power generation cells 12 that are located adjacent to the terminal plates 16*a* and 16*b*.

Recessed portions 62*a* and 62*b*, each having an opening facing the stacked body 14, are formed in central parts of the resin end plates 18*a* and 18*b*. The holes 56*a* and 56*b* are formed at substantially the centers of the bottom surfaces of the recessed portions 62*a* and 62*b* so as to extend through the resin end plates 18*a* and 18*b*. The terminal plates 16*a* and 16*b* are fitted into the recessed portions 62*a* and 62*b*.

Referring to FIGS. 1 and 2, second reinforcement ribs 64a and 64b are formed in outer surfaces 18as and 18bs of the resin end plates 18a and 18b (surfaces that do not face the stacked body 14). The second reinforcement ribs 64a and 64b are disposed at such positions that the second reinforcement ribs 64a and 64b overlap the first reinforcement ribs 58a and 58b of the terminal plates 16a and 16b when viewed in the stacking direction.

The second reinforcement ribs 64a and 64b are formed, for example, in grid-like patterns between a plurality of substantially rectangular recesses 66a and 66b, respectively, which are formed in the outer surfaces 18as and 18bs so as to be arranged in the horizontal direction and the vertical direction. The sizes of the openings of the recesses 66a and 66b are the same as those of the recesses 60a and 60b of the terminal plates 16a and 16b. Moreover, the recesses 66a and 66b are disposed at such positions that the recesses 66a and 66b overlap the recesses 60a and 60b when seen in the stacking direction. The shapes and the number of the recesses 66a and 66b may be changed in various ways.

Referring to FIG. 2, the height t1 of each of the second reinforcement ribs 64a and 64b in central parts of the resin end plates 18a and 18b is greater than the height t2 of each of the second reinforcement ribs 64a and 64b in peripheral parts of the resin end plates 18a and 18b (t1>t2). The second reinforcement ribs 64a and 64b are formed so as be curved in arc-like shapes along the longitudinal direction of the resin end plates 18a and 18b (direction of arrow B), so that the rigidities of the resin end plates 18a and 18b are improved. Alternatively, the second reinforcement ribs 64a and 64b may have liner shapes.

The oxidant gas inlet manifold 30a, the oxidant gas outlet manifold 30b, the fuel gas inlet manifold 32a, and the fuel gas outlet manifold 32b are formed in the resin end plate 18a. The resin end plate 18a is provided with an external oxidant gas inlet manifold 68a and an external oxidant gas outlet manifold 68b, which are respectively connected to the oxidant gas inlet manifold 30a and the oxidant gas outlet manifold 30b. The resin end plate 18a is provided with an external fuel gas inlet manifold 70a and an external fuel gas outlet manifold 70b, which are respectively connected to the fuel gas inlet manifold 32a and the fuel gas outlet manifold 32b.

The coolant inlet manifold 34a and the coolant outlet manifold 34b are formed in the resin end plate 18b. The resin end plate 18b is provided with an external coolant inlet manifold 72a and an external coolant outlet manifold 72b, which are respectively connected to the coolant inlet manifold 34a and the coolant outlet manifold 34b. In the present embodiment, spring members are not disposed at ends of the stacked body 14 of the fuel cell stack 10, and therefore the terminal plates 16a and 16b are directly in contact with the power generation cells 12 that are located at the ends.

The operation of the fuel cell stack 10 having the aforementioned structure will be described.

First, referring to FIG. 1, an oxidant gas, such as an oxygen-containing gas, is supplied to the oxidant gas inlet manifold 30a through the external oxidant gas inlet manifold 68a of the resin end plate 18a. A fuel gas, such as a hydrogen-containing gas, is supplied to the fuel gas inlet manifold 32a through the external fuel gas inlet manifold 70a of the resin end plate 18a. A coolant, such as pure water, ethylene glycol, or oil, is supplied to the coolant inlet manifold 34a through the external coolant inlet manifold 72a of the resin end plate 18b.

Referring to FIG. 4, the oxidant gas is introduced into the oxidant gas channel 36 of the first separator 26 through the oxidant gas inlet manifold 30a. The oxidant gas is supplied to the cathode electrode 48 of the membrane electrode assembly 24 while the oxidant gas flows along the oxidant gas channel 36 in the horizontal direction (direction of arrow B).

The fuel gas is introduced into the fuel gas channel 38 of the second separator 28 through the fuel gas inlet manifold 32a. The fuel gas is supplied to the anode electrode 50 of the membrane electrode assembly 24 while the fuel gas flows along the fuel gas channel 38 in the horizontal direction (direction of arrow B).

Accordingly, in the membrane electrode assembly 24, the oxidant gas supplied to the cathode electrode 48 and the fuel gas supplied to the anode electrode 50 are consumed in electrochemical reactions in the electrode catalyst layers, thereby generating electric power.

Next, the oxidant gas, which has been supplied to the cathode electrode 48 and consumed, flows along the oxidant gas outlet manifold 30b in the direction of arrow A, and is discharged from the external oxidant gas outlet manifold 68b of the resin end plate 18a (see FIG. 1). The fuel gas, which has been supplied to the anode electrode 50 and consumed, flows along the fuel gas outlet manifold 32b in the direction of arrow A, and is discharged from the external fuel gas outlet manifold 70b of the resin end plate 18a.

The coolant, which has been supplied to the coolant inlet manifold 34a, is introduced into the coolant channel 40 between the first separator 26 and the second separator 28, and then flows in the direction of arrow C. The coolant cools the membrane electrode assembly 24, and then the coolant is discharged from the coolant outlet manifold 34b to the external coolant outlet manifold 72b of the resin end plate 18b.

Referring to FIG. 2, in the present embodiment, the first reinforcement ribs 58a are formed between the recesses 60a in the surface 16as of the terminal plate 16a adjacent to the resin end plate 18a. Therefore, an advantage can be obtained in that the weight of the terminal plate 16a itself can be reduced and the rigidity of the resin end plate 18a can be reinforced.

Moreover, the second reinforcement rib 64a are formed in the outer surface 18as of the resin end plate 18a. Accordingly, the rigidity of the resin end plate 18a itself can be improved. Furthermore, the second reinforcement ribs 64a of the resin end plate 18a are disposed at such positions that the second reinforcement ribs 64a overlap the first reinforcement ribs 58a of the terminal plate 16a in the stacking direction. Therefore, the terminal plate 16a functions as a reinforcement member, so that an advantage can be obtained in that the rigidity of the resin end plate 18a can be further improved and the function of reinforcing the resin end plate 18a can be favorably improved.

The second reinforcement ribs 64a of the resin end plate 18a are formed so that the height t1 of each of the second reinforcement ribs 64a near a central part of the resin end plate 18a is greater than the height t2 of the second reinforcement rib 64a near a peripheral part of the resin end plate 18a. To be specific, each of the second reinforcement ribs 64a is curved in an arc shape along the longitudinal direction of the resin end plate 18a (direction of arrow B). Therefore, an advantage is obtained in that the rigidity of the resin end plate 18a can be sufficiently improved while reducing the weight of the resin end plate 18a.

Likewise, the terminal plate 16b and the resin end plate 18b provide an advantage the same as that of the terminal plate 16a and the resin end plate 18a described above.

According to the present disclosure, a fuel cell stack includes a stacked body including a plurality of power generation cells that are stacked, each of the power generation cells including a membrane electrode assembly and a separator, the membrane electrode assembly including an electrolyte and a pair of electrodes sandwiching the electrolyte therebetween. The fuel cell stack further includes a terminal plate and a resin end plate that are disposed at each end of the stacked body in a stacking direction so as to be arranged outward. A reinforcement rib is formed in a surface of each terminal plate, the surface being parallel to surfaces of the electrodes.

In the fuel cell stack, the reinforcement rib may be formed between a plurality of recesses formed in a surface of the terminal plate, the surface being in contact with the resin end plate.

In the fuel cell stack, an external size of the terminal plate may be smaller than that of the resin end plate. A recessed portion into which the terminal plate is fitted is formed in the resin end plate.

In the fuel cell stack, a reinforcement rib may be formed in the resin end plate. The reinforcement rib of the resin end plate is disposed at such a position that the reinforcement rib of the resin end plate overlaps the reinforcement rib of the terminal plate in the stacking direction.

In the fuel cell stack, a height of the reinforcement rib of the resin end plate near a central part of the resin end plate may be greater than a height of the reinforcement rib near a peripheral part of the resin end plate.

The fuel cell stack may further include a terminal portion that is integrally formed with the terminal plate so as to protrude from the surface of the terminal plate toward the resin end plate.

According to the present disclosure, the reinforcement rib is formed in the surface of each terminal plate, the surface being parallel to surfaces of the electrodes and adjacent to a corresponding one of the resin end plates. Therefore, the weight of the terminal plate itself can be reduced and the rigidity of the resin end plate can be sufficiently reinforced.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell stack comprising:
a stacked body including a plurality of power generation cells that are stacked, each of the power generation cells including a membrane electrode assembly and a separator, the membrane electrode assembly including an electrolyte and a pair of electrodes sandwiching the electrolyte therebetween; and
a terminal plate and a resin end plate that are disposed at each end of the stacked body in a stacking direction so as to be arranged outward,
wherein a reinforcement rib is formed in a surface of each terminal plate, the surface being parallel to surfaces of the electrodes, and
wherein the reinforcement rib is formed between a plurality of recesses formed in a surface of the terminal plate, the surface being in contact with the resin end plate.

2. A fuel cell stack comprising:
a stacked body including a plurality of power generation cells that are stacked, each of the power generation cells including a membrane electrode assembly and a separator, the membrane electrode assembly including an electrolyte and a pair of electrodes sandwiching the electrolyte therebetween; and
a terminal plate and a resin end plate that are disposed at each end of the stacked body in a stacking direction so as to be arranged outward,
wherein a reinforcement rib is formed in a surface of each terminal plate, the surface being parallel to surfaces of the electrodes,
wherein an external size of the terminal plate is smaller than that of the resin end plate, and
wherein a recessed portion into which the terminal plate is fitted is formed in the resin end plate.

3. A fuel cell stack comprising:
a stacked body including a plurality of power generation cells that are stacked, each of the power generation cells including a membrane electrode assembly and a separator, the membrane electrode assembly including an electrolyte and a pair of electrodes sandwiching the electrolyte therebetween; and
a terminal plate and a resin end plate that are disposed at each end of the stacked body in a stacking direction so as to be arranged outward,
wherein a reinforcement rib is formed in a surface of each terminal plate, the surface being parallel to surfaces of the electrodes,
wherein a reinforcement rib is formed in the resin end plate, and
wherein the reinforcement rib of the resin end plate is disposed at such a position that the reinforcement rib of the resin end plate overlaps the reinforcement rib of the terminal plate in the stacking direction.

4. The fuel cell stack according to claim 3,
wherein a height of the reinforcement rib of the resin end plate near a central part of the resin end plate is greater than a height of the reinforcement rib near a peripheral part of the resin end plate.

5. The fuel cell stack according to claim 1, further comprising:
a terminal portion that is integrally formed with the terminal plate so as to protrude from the surface of the terminal plate toward the resin end plate.

6. A fuel cell stack comprising:
a stacked body including a plurality of power generation cells stacked in a stacking direction, each of the plurality of the power generation cells including a separator and a membrane electrode assembly which includes an electrolyte and first and second electrodes sandwiching the electrolyte between the first and second electrodes, the stacked body having a first end and a second end opposite to the first end in the stacking direction;
a first terminal plate provided on the first end of the stacked body in the stacking direction to have a first surface substantially parallel to surfaces of the first and second electrodes, the first terminal plate including a first reinforcement rib provided in the first surface;
a second terminal plate provided on the second end of the stacked body in the stacking direction to have a second surface substantially parallel to the surfaces of the first and second electrodes, the second terminal plate including a second reinforcement rib provided in the second surface;
a first resin end plate provided on the first terminal plate in the stacking direction; and a second resin end plate provided on the second terminal plate in the stacking direction, wherein the first reinforcement rib is provided between a plurality of first recesses provided in the first surface of the first terminal plate, the first surface being in contact with the first resin end plate, and wherein the second reinforcement rib is provided between a plurality of second recesses provided in the second surface of the second terminal plate, the second surface being in contact with the second resin end plate.

7. A fuel cell stack comprising:

a stacked body including a plurality of power generation cells stacked in a stacking direction, each of the plurality of the power generation cells including a separator and a membrane electrode assembly which includes an electrolyte and first and second electrodes sandwiching the electrolyte between the first and second electrodes, the stacked body having a first end and a second end opposite to the first end in the stacking direction;

a first terminal plate provided on the first end of the stacked body in the stacking direction to have a first surface substantially parallel to surfaces of the first and second electrodes, the first terminal plate including a first reinforcement rib provided in the first surface;

a second terminal plate provided on the second end of the stacked body in the stacking direction to have a second surface substantially parallel to the surfaces of the first and second electrodes, the second terminal plate including a second reinforcement rib provided in the second surface;

a first resin end plate provided on the first terminal plate in the stacking direction; and a second resin end plate provided on the second terminal plate in the stacking direction, wherein an external size of the first terminal plate is smaller than an external size of the first resin end plate, wherein a first recessed portion into which the first terminal plate is fitted is provided in the first resin end plate, wherein an external size of the second terminal plate is smaller than an external size of the second resin end plate, and wherein a second recessed portion into which the second terminal plate is fitted is provided in the second resin end plate.

8. A fuel cell stack comprising:

a stacked body including a plurality of power generation cells stacked in a stacking direction, each of the plurality of the power generation cells including a separator and a membrane electrode assembly which includes an electrolyte and first and second electrodes sandwiching the electrolyte between the first and second electrodes, the stacked body having a first end and a second end opposite to the first end in the stacking direction;

a first terminal plate provided on the first end of the stacked body in the stacking direction to have a first surface substantially parallel to surfaces of the first and second electrodes, the first terminal plate including a first reinforcement rib provided in the first surface;

a second terminal plate provided on the second end of the stacked body in the stacking direction to have a second surface substantially parallel to the surfaces of the first and second electrodes, the second terminal plate including a second reinforcement rib provided in the second surface;

a first resin end plate provided on the first terminal plate in the stacking direction; and a second resin end plate provided on the second terminal plate in the stacking direction, wherein a third reinforcement rib is provided in the first resin end plate, wherein the third reinforcement rib of the first resin end plate is disposed at such a position that the third reinforcement rib of the first resin end plate overlaps the first reinforcement rib of the first terminal plate in the stacking direction, wherein a fourth reinforcement rib is provided in the second resin end plate, and wherein the fourth reinforcement rib of the second resin end plate is disposed at such a position that the fourth reinforcement rib of the second resin end plate overlaps the second reinforcement rib of the second terminal plate in the stacking direction.

9. The fuel cell stack according to claim 8, wherein a height of the third reinforcement rib of the first resin end plate near a central part of the first resin end plate is greater than a height of the third reinforcement rib near a peripheral part of the first resin end plate, and wherein a height of the fourth reinforcement rib of the second resin end plate near a central part of the second resin end plate is greater than a height of the fourth reinforcement rib near a peripheral part of the second resin end plate.

10. The fuel cell stack according to claim 6, further comprising:

a first terminal portion that is integrally provided with the first terminal plate so as to protrude from the first surface of the first terminal plate toward the first resin end plate; and a second terminal portion that is integrally provided with the second terminal plate so as to protrude from the second surface of the second terminal plate toward the second resin end plate.

11. A fuel cell stack comprising:

a stacked body including a plurality of power generation cells stacked in a stacking direction, each of the plurality of the power generation cells including a separator and a membrane electrode assembly which includes an electrolyte and first and second electrodes sandwiching the electrolyte between the first and second electrodes, the stacked body having a first end and a second end opposite to the first end in the stacking direction;

a first terminal plate provided on the first end of the stacked body in the stacking direction to have a first surface substantially parallel to surfaces of the first and second electrodes, the first terminal plate including a first reinforcement rib provided in the first surface;

a second terminal plate provided on the second end of the stacked body in the stacking direction to have a second surface substantially parallel to the surfaces of the first and second electrodes, the second terminal plate including a second reinforcement rib provided in the second surface;

a first resin end plate provided on the first terminal plate in the stacking direction; and a second resin end plate provided on the second terminal plate in the stacking direction, wherein a third reinforcement rib is provided in the first resin end plate, wherein the third reinforcement rib is curved in an arc shape along a longitudinal direction of the first resin end plate, wherein a fourth reinforcement rib is provided in the second resin end plate, and wherein the fourth reinforcement rib is curved in an arc shape along a longitudinal direction of the second resin end plate.

\* \* \* \* \*